United States Patent
Mizusawa (10) Patent No.: US 7,145,485 B2
(45) Date of Patent: Dec. 5, 2006

(54) VEHICLE IDENTIFICATION CODE STORING DEVICE AND METHOD FOR STORING VEHICLE IDENTIFICATION CODE

(75) Inventor: Kazuya Mizusawa, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 66 days.

(21) Appl. No.: 10/835,203

(22) Filed: Apr. 30, 2004

(65) Prior Publication Data

US 2004/0233077 A1    Nov. 25, 2004

(30) Foreign Application Priority Data

May 22, 2003    (JP)    ............... 2003-144800

(51) Int. Cl.
   *H03M 7/00*    (2006.01)
(52) U.S. Cl. ............... 341/87; 340/5.61; 340/426.18; 340/425.5; 340/993
(58) Field of Classification Search ............... 341/87; 340/425.5, 426.18, 5.61, 993; 701/48; 713/170
   See application file for complete search history.

(56) References Cited

U.S. PATENT DOCUMENTS

| | | | | |
|---|---|---|---|---|
| 3,718,899 A | * | 2/1973 | Rollins | ............... 340/993 |
| 5,600,723 A | * | 2/1997 | Woodall et al. | ............... 713/170 |
| 5,801,614 A | * | 9/1998 | Kokubu | ............... 340/425.5 |
| 5,939,975 A | * | 8/1999 | Tsuria et al. | ............... 340/426.18 |
| 5,974,368 A | * | 10/1999 | Schepps et al. | ............... 340/5.61 |
| 6,076,064 A | | 6/2000 | Rose, Jr. | ............... 705/1 |
| 6,195,602 B1 | * | 2/2001 | Hazama et al. | ............... 701/48 |
| 2002/0145666 A1 | | 10/2002 | Scaman et al. | ............... 348/148 |

FOREIGN PATENT DOCUMENTS

| | | |
|---|---|---|
| JP | 05-172702 | 7/1993 |
| JP | 11-255079 | 9/1999 |
| JP | 2000-185606 | 7/2000 |
| JP | 2001-301572 | 10/2001 |

\* cited by examiner

*Primary Examiner*—Jean Bruner Jeanglaude
(74) *Attorney, Agent, or Firm*—Kenyon & Kenyon LLP (57) ABSTRACT

A device stores a vehicle identification code that includes a character string of a plurality of digits. The device includes a writing request detection section that detects a request for writing the vehicle identification code. An encoding section compresses and encodes the vehicle identification code that corresponds to the detected writing request to generate a storage code. A storage code storing section stores the storage code. Therefore, the device efficiently stores the vehicle identification codes in a nonvolatile memory.

16 Claims, 6 Drawing Sheets

| Higher-Order Three Bits → / ↓ Lower-Order Four Bits | 0 | 1 | 2 | 3 | 4 | 5 | 6 | 7 |
|---|---|---|---|---|---|---|---|---|
| 0 | NUL | DLE | SP | 0 | @ | P | ` | p |
| 1 | SOH | DC1 | ! | 1 | A | Q | a | q |
| 2 | STX | DC2 | " | 2 | B | R | b | r |
| 3 | ETX | DC3 | # | 3 | C | S | c | s |
| 4 | EOT | DC4 | $ | 4 | D | T | d | t |
| 5 | ENQ | NAC | % | 5 | E | U | e | u |
| 6 | ACK | SYN | & | 6 | F | V | f | v |
| 7 | BEL | ETB | ' | 7 | G | W | g | w |
| 8 | BS | CAN | ( | 8 | H | X | h | x |
| 9 | HT | EM | ) | 9 | I | Y | i | y |
| A | LF/NL | SUB | * | ; | J | Z | j | z |
| B | VT | ESC | + | : | K | [ | k | { |
| C | FF | FS | , | < | L | ¥ | l | \| |
| D | CR | GS | - | = | M | ] | m | } |
| E | SO | RS | . | > | N | ^ | n | ~ |
| F | SI | US | / | ? | O | _ | o | DEL |

| Character | Code |
|---|---|
| 0 | 000011 |
| 1 | 011011 |
| 2 | 000110 |
| 3 | 001100 |
| 4 | 010001 |
| ⋮ | ⋮ |
| A | 011010 |
| B | 011111 |
| C | 000100 |
| ⋮ | ⋮ |
| Z | 000001 |

VEHICLE IDENTIFICATION CODE STORING DEVICE AND METHOD FOR STORING VEHICLE IDENTIFICATION CODE

BACKGROUND OF THE INVENTION

The present invention relates to a technique for storing a vehicle identification code in a vehicle electronic control unit.

The vehicle identification number (VIN) code has been used as a standard for identifying vehicles. The VIN code system is specified for character strings representing the specification and options of a vehicle, a factory where the vehicle was assembled. A VIN code is unique for each vehicle for identifying the vehicle. In a vehicle, a VIN code is imprinted in various parts. Even if a vehicle is disassembled, the VIN code on each component permits that the component to be identified as a component of the specific vehicle.

The VIN code is imprinted in an electronic control unit (ECU) of a vehicle, which controls the engine. The VIN code is typically stored in a nonvolatile memory such as an electronically erasable and programmable read only memory (EEPROM) of the engine ECU during the assembly at the manufacturer (Japanese Laid-Open Patent Publications No. 2001-301572, No. 2000-185606, No. 11-255079, and No. 5-172702).

Many types of EEPROM require data to be written more than one byte at a time. Some EEPROMs cannot permit data to be written other than four, eight or sixteen bytes at a time. Since a VIN code is a seventeen digit character string, the size of the unit of data writable in an EEPROM can cause a drawback.

When writing a VIN code in an EEPROM that only permits data to be written eight bytes at a time, a memory area of twenty-four bytes, which corresponds to three sets of eight byte writing, is required. Although the VIN code is a seventeen digit character string and thus has a size of seventeen bytes, data of only sixteen bytes can be written in two writings of eight-byte data. Accordingly, to complete the writing of the data in the EEPROM, another writing process is needed. Therefore, a twenty-four byte memory area is needed in the EEPROM. At this time, seven bytes, which correspond to the difference between the written twenty-four byte data and the seventeen byte data representing the VIN code, is wastefully consumed. For the same reason, when writing a VIN code in an EEPROM that permits data to be written sixteen bytes at a time, a memory area of thirty-two bytes, which corresponds to two sets of sixteen byte writing, is required. In this case, fifteen bytes, which correspond to the difference between the written thirty-two byte data and the seventeen byte data representing the VIN code, is wastefully consumed.

The modes for reading and writing data to versatile EEPROMs are on public view. If a VIN code is written in such an EEPROM without being changed, anyone can easily reads the content of the VIN code. Therefore, the VIN code of a stolen engine ECU is easily tampered with. This creates a drawback in the antitheft measures.

SUMMARY OF THE INVENTION

Accordingly, it is an objective of the present invention to provide a technique for efficiently storing VIN codes in a nonvolatile memory.

To achieve the above-mentioned objective, the present invention provides a device for storing a vehicle identification code that includes a character string of a plurality of digits. The device includes a writing request detection section that detects a request for writing the vehicle identification code. An encoding section compresses and encodes the vehicle identification code that corresponds to the detected writing request to generate a storage code. A storage code storing section stores the storage code.

According to another aspect of the invention, a method for storing a vehicle identification code that includes a character string of a plurality of digits is provided. The method includes detecting a request for writing the vehicle identification code; compressing and encoding a vehicle identification code that corresponds to the detected the writing request, thereby generating a storage code; and storing the encoded storage code in a storage medium.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 1:
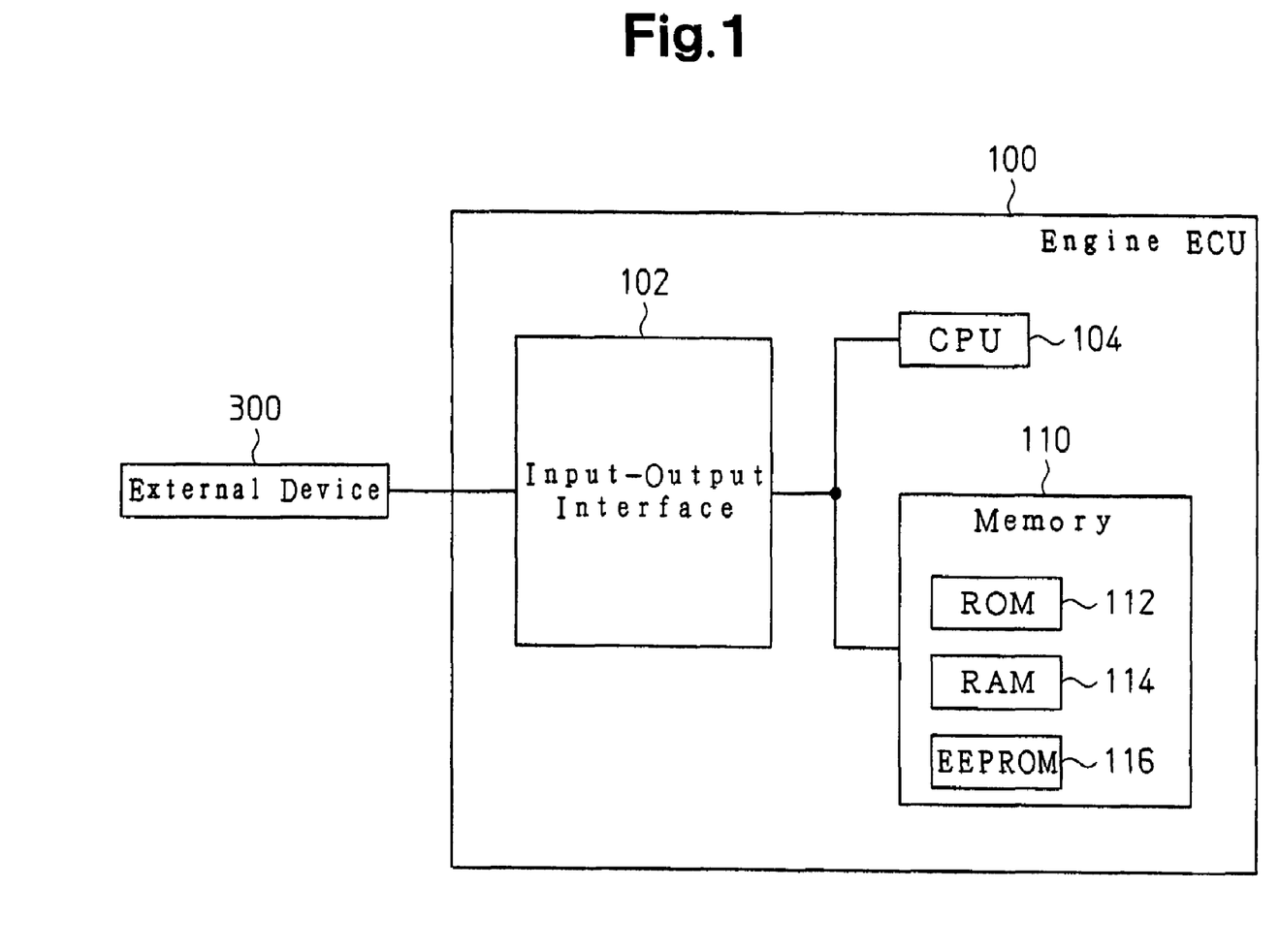
FIG. 1 is a diagrammatic view showing the hardware configuration of an engine ECU according to a first embodiment of the present invention.

FIG. 1 is a diagram showing a basic configuration of an engine ECU 100. The engine ECU 100 includes an input-output interface 102, a central processing unit (CPU) 104, and a memory 110. The memory 110 includes a read only memory (ROM) 112, a random access memory (RAM) 114, and an EEPROM 116. Through the input-output interface 102, the memory 110 successively receives detection signals from external devices 300 such as a rotation sensor, an airflow meter, and a water temperature sensor. Based on the detection signals, the CPU 104 controls the amount of fuel injection by an injector and the ignition timing of an igniter such that the engine operates in an optimum state. The EEPROM 116 stores data such as a VIN code, which functions as a vehicle identification code.

Figure 2:
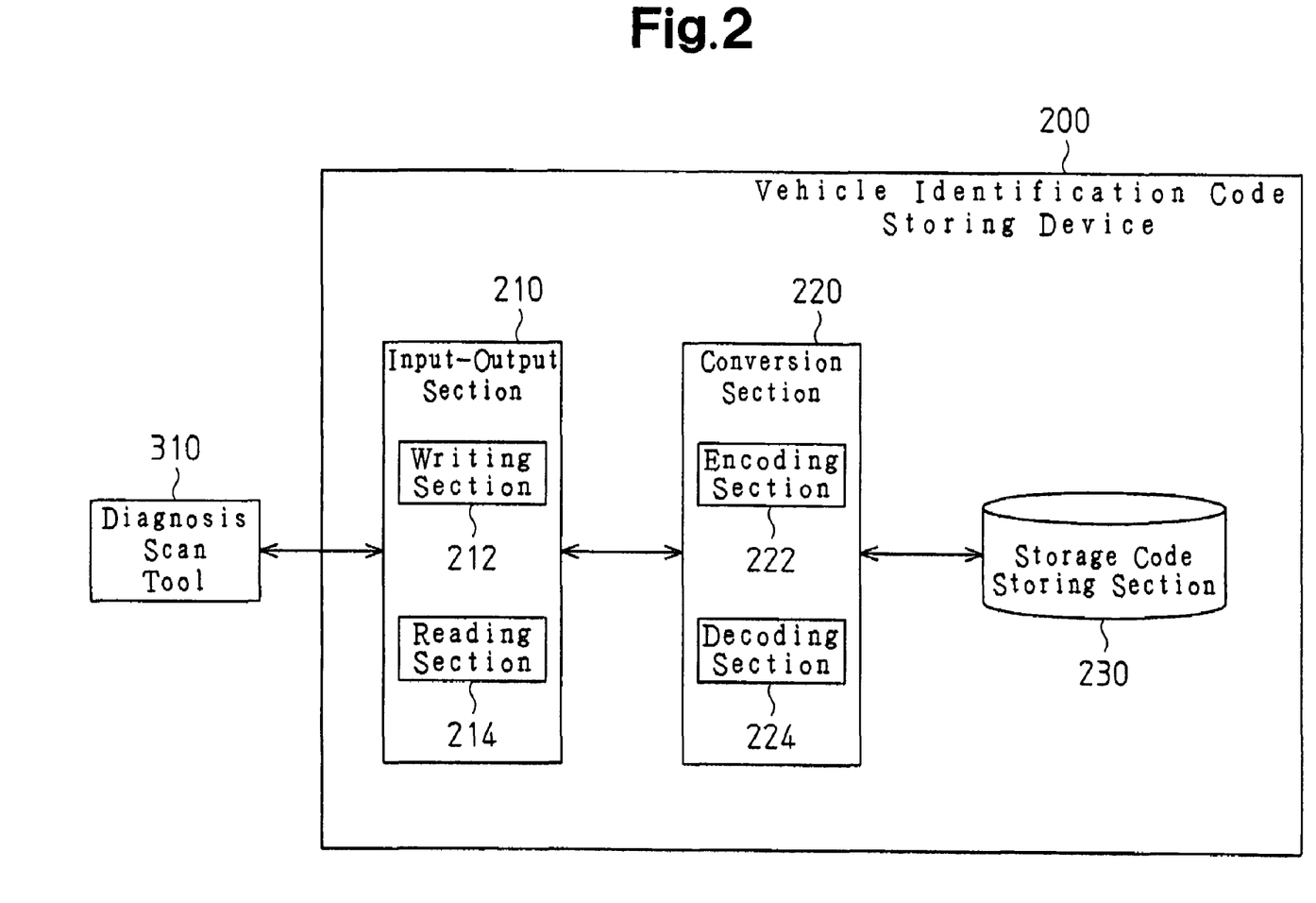
FIG. 2 is a diagram showing functional blocks of a vehicle identification code storing device.

FIG. 2 is a diagram showing functional blocks of a vehicle identification code storing device 200. The vehicle identification code storing device 200 does not represent a hardware unit in the ECU 100, but represents a set of functional blocks for storing the VIN code. Each element of the vehicle identification code storing device 200 is implemented by combining necessary pieces of hardware and software. As is well known to those skilled in the art, storing device 200 can be implemented with methods or devices other than presented in this embodiment.

The vehicle identification code storing device 200 includes an input-output section 210, a conversion section 220, and a storage code storing section 230. The input-output section 210 functions as an interface for inputting and outputting a VIN code. The input-output section 210 receives and sends a VIN code from and to external devices such as a diagnosis scan tool 310. The input-output section 210 includes a writing section 212 for writing a VIN code and a reading section 214 for reading a VIN code. The conversion section 220 converts a VIN code into a storage code by compressing and encoding. The conversion section 220 also converts a storage code into a VIN code. The conversion section 220 includes an encoding section and a decoding section 224. The encoding section 222 encodes a VIN code into a storage code. On the other hand, the decoding section 224 decodes the storage code to the VIN code. The storage code storing section 230 stores storage codes.

Figure 3:
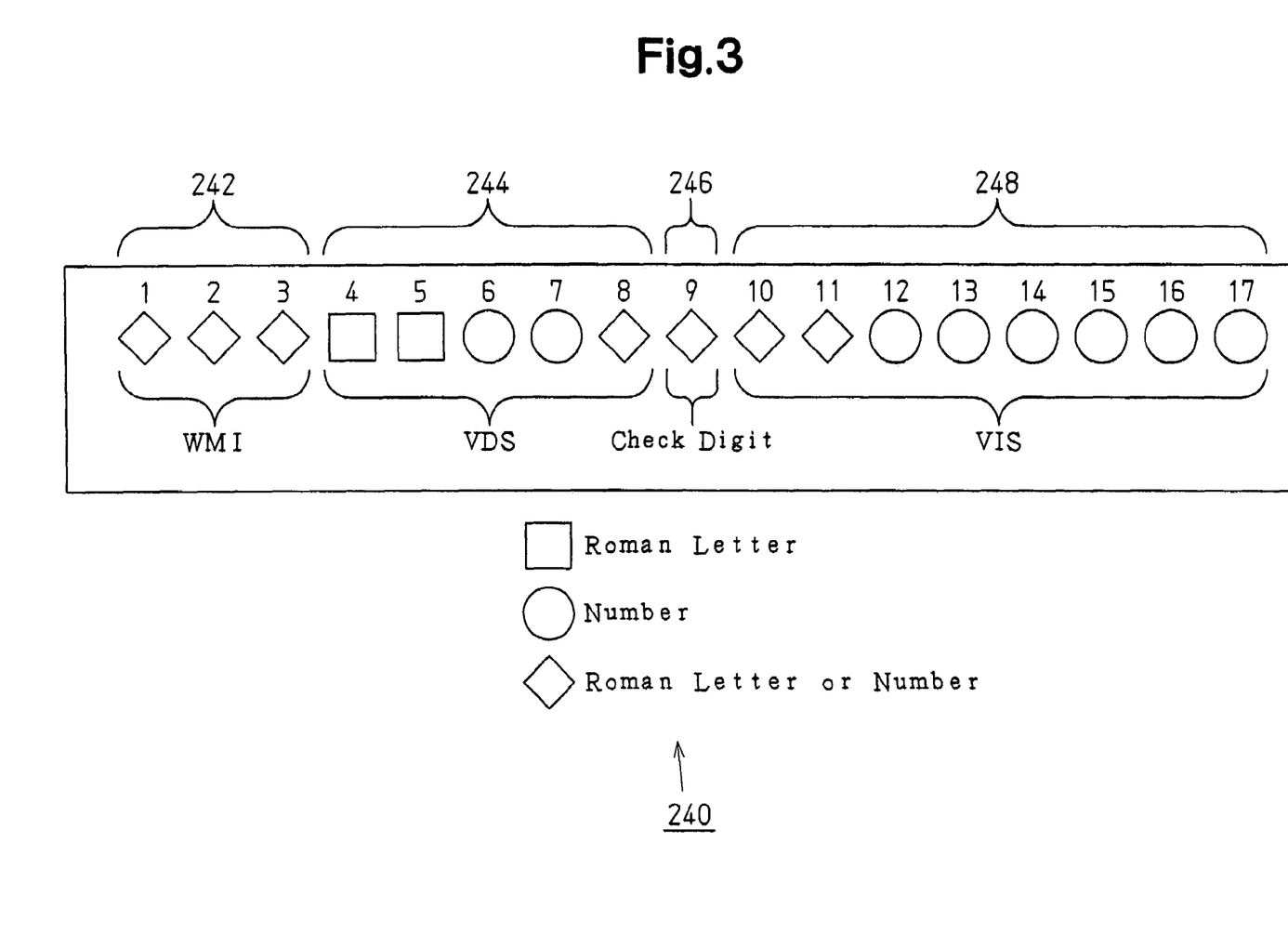
FIG. 3 is a diagram showing the structure of the global VIN code.

FIG. 3 shows the contents of a VIN code 240. There are several types of VIN codes 240, such as the global VIN and the US VIN. All the types include seventeen digits of roman letters and numbers and have similar systems. The VIN code 240 in FIG. 3 has components according to the global VIN.

The VIN code 240 can be divided into several sections. These sections include a world manufacturer identifier 242 (WMI), which identifies the manufacturer and the type of the vehicle. A vehicle descriptor section (VDS) 244 identifies attributes of the vehicle. A check digit 246 is used for detecting errors in writing and reading of the VIN code 240. A vehicle indicator section (VIS) 248 is used for identifying a specific vehicle from vehicles having the same VDS. When storing a VIN code 240 in a nonvolatile memory such as an EEPROM, the digits are associated with character codes such as ASCII codes. At this time, one byte is typically assigned to each digit.

Figure 4:
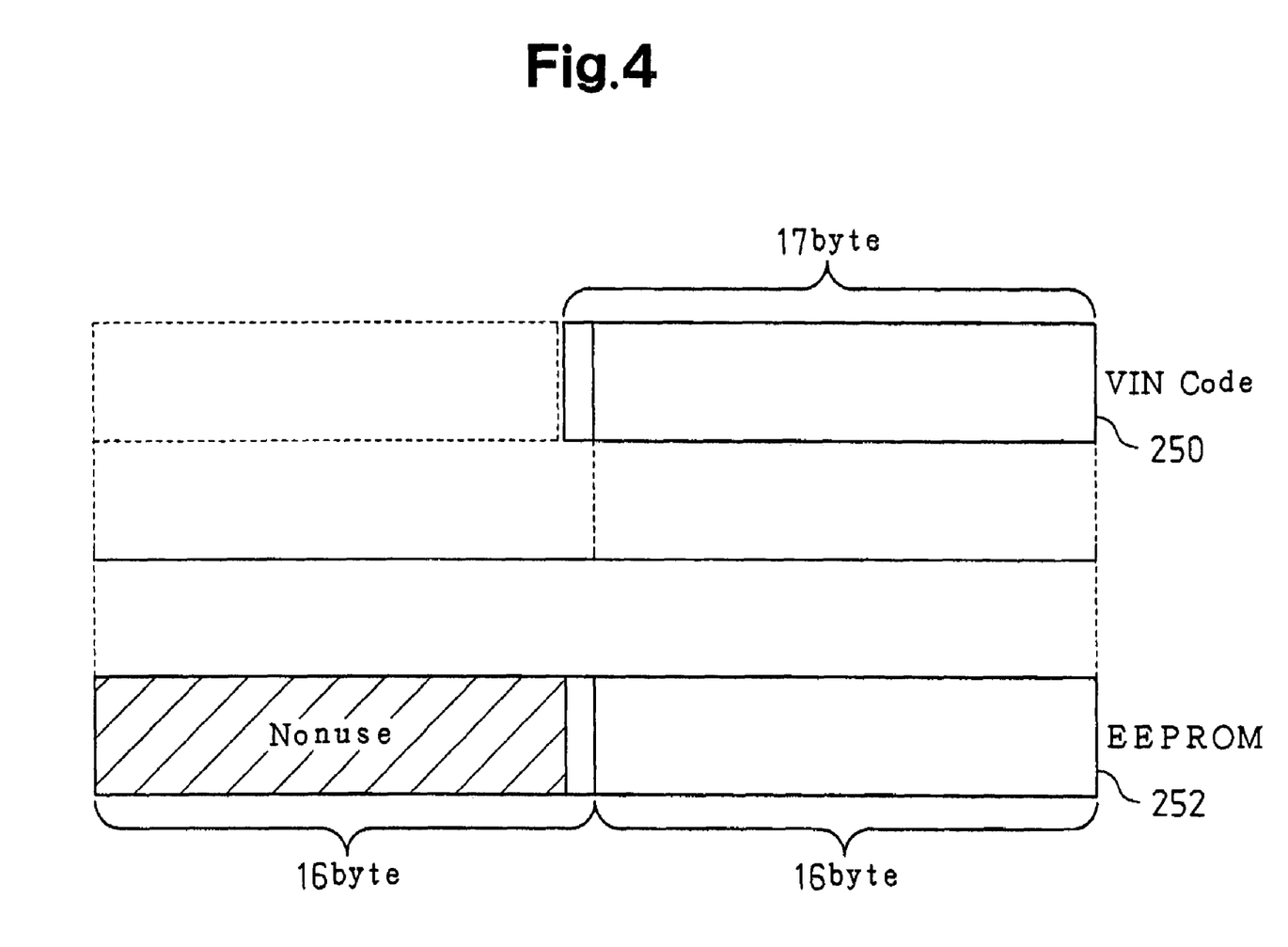
FIG. 4 is a diagram showing a problem caused by writing a VIN code in an EEPROM.

FIG. 4 is a diagram showing a problem caused by writing the VIN code 250 in an EEPROM 252. In FIG. 4, the EEPROM 252 supports writing of data sixteen bytes at a time. As shown in FIG. 4, up to sixteen bytes of data are written in the EEPROM 252 in a single writing. At this time, one of the seventeen bytes of the VIN code 250 remains unwritten. To write the remaining one byte of the VIN code 250, another writing of sixteen bytes is performed. As a result, a thirty-two byte memory area is needed in the EEPROM 252. However, a portion of the memory area of fifteen bytes is wastefully consumed.

Figure 5:
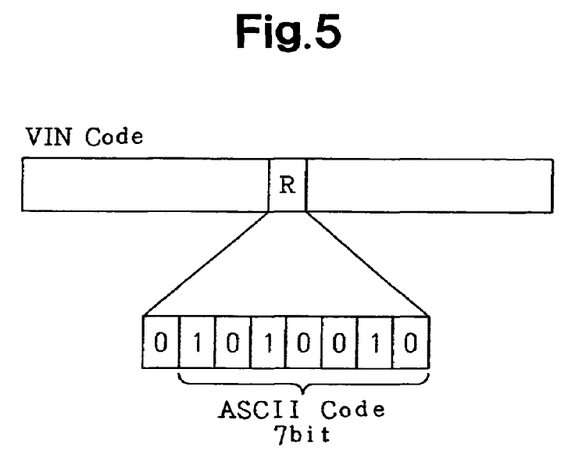
FIG. 5 is a diagram showing a compression of a VIN code according to the first embodiment.

FIG. 5 diagrammatically shows a compression mode of a VIN code according to the first embodiment of the present invention. In FIG. 5, the letter R is included in a VIN code. The size of the data represented by the letter R is compressed. Typically, a letter is expressed by seven-bit data according to the ASCII code (see FIG. 6). When expressed by a binary number, the ASCII code for the letter R is 1010010. When a VIN code is transmitted to the writing section 212 from the diagnosis scan tool 310 shown in FIG. 2, the size of each digit of the VIN code is normalized to one byte, or eight bits. In the normalization, the most significant bit of each digit is padded with zero. However, zero at the most significant bit is only added for the normalization at the transmission. Therefore, when the encoding section 222 deletes zero, which has been padded to the most significant bit, the size of each digit in the VIN code is reduced from eight bits to seven bits.

When the size of each digit of the VIN code is eight bits, a memory area of 136 bits, which is equivalent to eight sets of seventeen digits, that is, a memory area of seventeen bytes, is required. However, if the size of each digit is seven bits, the size of the required memory area is reduced 119 bits, which is equivalent to seventeen letters of seven bits, that is, less than fifteen bytes. Therefore, if a unit of writing of an EEPROM is sixteen bytes, a single writing permits the VIN code to be stored. Further, compared to a case in which the process of this embodiment is not executed, the memory area of the EEPROM is significantly saved. Hereinafter, binary numbers will be expressed by (2), for example, 011(2), decimal numbers will be expressed by (10), for example, 3(10), and hexadecimal numbers will be expressed by (16), for example, 3(16). When a number is expressed by a character as in a digit expressing a number (number digit) in the VIN code, numbers are expressed by (C), as, for example, in 3(C). That is, the number digits in a vehicle identification code are normally converted as character codes such as ASCII codes. In other words, the number digits in a vehicle identification code are not expressed as numbers, but as character codes corresponding to numbers.

Figure 6:
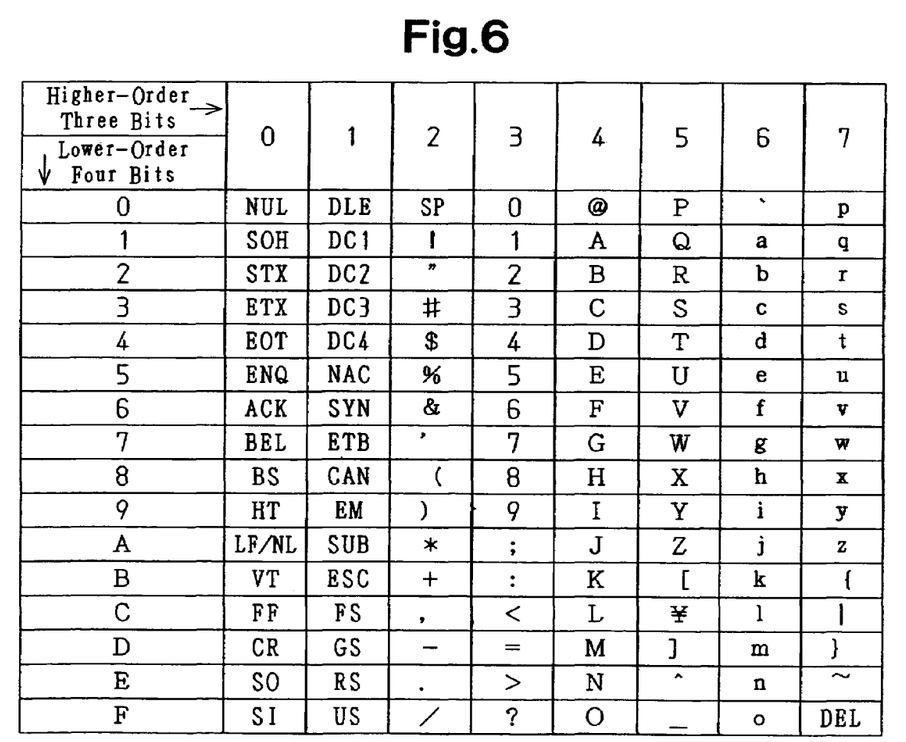
FIG. 6 is an ASCII Code table.

FIG. 6 is an ASCII code table. In a second embodiment of the present invention, the ASCII codes representing the digits of a VIN code are subjected to a predetermined logical operation so that the VIN code is compressed. The operation will be described with reference to FIG. 6. According to FIG. 6, the higher-order bits of all the digit in a VIN code are expressed by three bits, and the lower-order bits are expressed by four bits. The ASCII codes in the digits in the VIN code, which are among 0(C) to 9(C) and A(C) to Z(C), are all expressed numbers no less than 30(16). Therefore, the each digit of the VIN code can be compressed by subtracting 30(16) from the digit. For example, when 30(16) is subtracted from 33(16), which is the ASCII code expressing the number 3(C), the resultant is 3(16), or 0000011(2). The ASCII code of Z(C) is 5A(16), which is the greatest of the values used in the digits of the VIN code. When 30(16) is subtracted from 5A(16), the resultant is 2A(16), or 0101010 (2). Accordingly, all the digit in the VIN code can be expressed by six bits or less. In this manner, since the number digits are not treated as character codes, but as binary numbers in this embodiment, the size of the vehicle identification code is compressed. All the number digits in the vehicle identification code may be compressed in the manner according to the second embodiment. Alternatively, some of the number digits may be extracted and compressed. When some of the number digits are extracted, the extracted number digits need not be adjacent ones in the vehicle identification code.

When used together with the method presented in the first embodiment, the size of the required memory area is reduced to 102 bits, which is equivalent to seventeen letters of six bits, that is, less than thirteen bytes or 104 bits. In other words, a further compression is possible.

Figure 7:
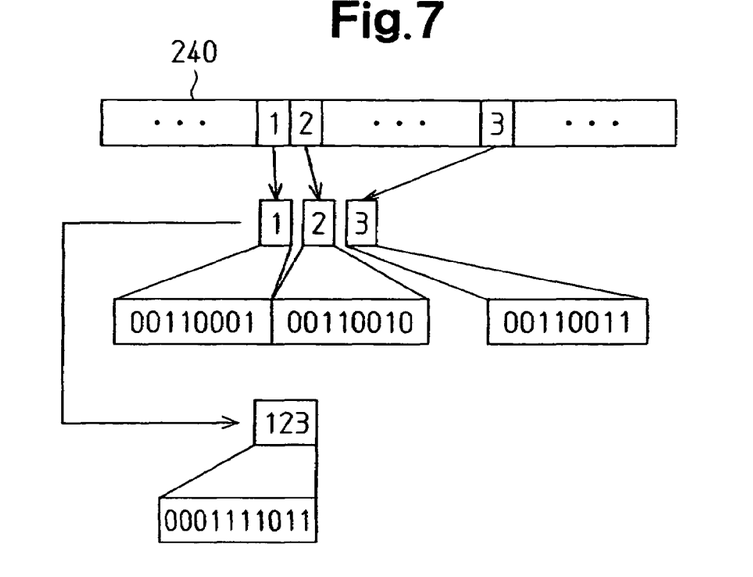
FIG. 7 is a diagram showing a compression of a VIN code according to a third embodiment of the present invention.

FIG. 7 is a diagram showing a method for extracting and compressing number digits in a VIN code in a third embodiment of the present invention. In FIG. 7, 1(C), 2(C), and 3(C) in the number digits are extracted from the VIN code and compressed. Typically, 1(C), 2(C), and 3(C), which are number digits, are each expressed by a one-byte character code. Therefore, if uncompressed, a memory area of 24 bits, which is equivalent to three letters of eight bits, that is, a memory area of three bytes, is required.

In this embodiment, 1(C), 2(C), and 3(C) are concatenated to express 123(10). 123(10) is equivalent to 1111011 (2). To express a three-figure decimal number, up to 10 bits of data is needed. Thus, when expressed by ten bits, 123(10) is 0001111011(2). That is, although 1(C), 2(C), and 3(C) require twenty-four bits when expressed separately, the required size is compressed to ten bits in this embodiment.

Figure 8:
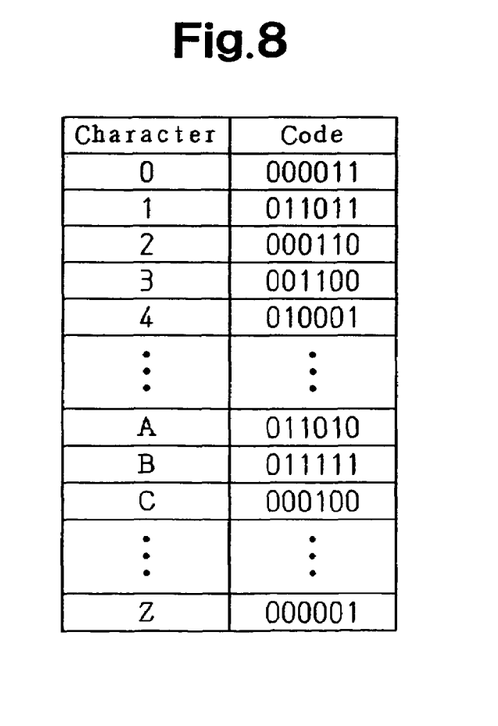
FIG. 8 is a diagrammatic view showing a code conversion method for converting each digit of the VIN code according to the fourth embodiment of the present invention.

FIG. 8 is an original table used in a method for encoding and compressing each digit in a VIN code in the fourth embodiment of the present invention.. In a VIN code, twenty-three roman letters and ten numbers can be used. Therefore, thirty-three characters can be used. Thirty-three characters can be distinguished within six bits. In this embodiment, instead of the widely used ASCII codes, one of original six-bit codes is assigned to each digit of a VIN code. In FIG. 8, codes from 0(10) to 32(10) are assigned to the thirty-three characters used in the VIN code. For example, in FIG. 8, 010001(2) is assigned to 4(C). If the encoding and decoding of the VIN code and the original code are performed only possible when the conversion section 220 is used, it will be difficult to directly read the VIN code from the EEPROM or to tamper with the VIN code.

A reading request detection section and a vehicle identification code sending section of claim 1 correspond to the reading section 214 in FIG. 2. A writing request detection section of claim 1 corresponds to the writing section 212 in FIG. 2.

In each of the above described embodiments, a VIN code is compressed and stored in the EEPROM. In the fourth embodiment, a VIN code is not encoded with the ASCII codes, but with a set of the original codes. This makes it difficult to conjecture the VIN code even if the EEPROM is directly read. The fourth embodiment therefore has an advantage of encryption. This improves the antitheft performance. Particularly, the fourth embodiment is advantageous when a versatile EEPROM, reading and writing methods of which are on public view, is used in the engine ECU. The methods of the first to fourth embodiments may be used together. This further saves the memory area.

The present examples and embodiments are to be considered as illustrative and not restrictive and the invention is not to be limited to the details given herein, but may be modified within the scope and equivalence of the appended claims.

The invention claimed is:

1. A device for storing a vehicle identification code that includes a character string of a plurality of digits, the device comprising:
    a writing request detection section that detects a request for writing the vehicle identification code;
    an encoding section that compresses and encodes the vehicle identification code that corresponds to the detected writing request, thereby generating a storage code; and
    a storage code storing section that stores the storage code, wherein each character in the vehicle identification code is inputted as proper data to the encoding section, the proper data contains code data representing the character and overhead bit data appended to the code data, wherein the encoding section deletes at least part of the overhead bit data, thereby compressing the vehicle identification code into the storage code.

2. The device according to claim 1, wherein the proper data includes a string of a multiple bits, and wherein the encoding section deletes the most significant bit of the string.

3. The device according to claim 2, wherein the string includes bits corresponding to an ASCII code and a bit that is appended as the most significant bit to the bits corresponding to the ASCII code.

4. A device for storing a vehicle identification code that includes a character string of a plurality of digits, the device comprising:
    a writing request detection section that detects a request for writing the vehicle identification code;
    an encoding section that compresses and encodes the vehicle identification code that corresponds to the detected writing request, thereby generating a storage code; and
    a storage code storing section that stores the storage code, wherein each character in the vehicle identification code is expressed by a binary code that corresponds to a hexadecimal number equal to or greater than a predetermined value, wherein the encoding section subtracts a hexadecimal number equal to or less than the predetermined value from a hexadecimal number corresponding to the inputted binary code, and wherein the encoding section expresses the resultant of the subtraction with a binary code the number of bits of which is less than that of the inputted binary code, thereby compressing the vehicle identification code into the storage code.

5. The device according to claim 4, wherein the predetermined value of hexadecimal number is 30.

6. A device for storing a vehicle identification code that includes a character string of a plurality of digits, the device comprising:
    a writing request detection section that detects a request for writing the vehicle identification code;
    an encoding section that compresses and encodes the vehicle identification code that corresponds to the detected writing request, thereby generating a storage code; and
    a storage code storing section that stores the storage code, wherein the encoding section extracts digits that represent numeric values from a string in the vehicle identification code, wherein the encoding section puts the extracted digits into an order to obtain a sequence, and interprets the sequence as a single number, and wherein, based on the single number, the encoding section generates the storage code.

7. The device according to claim 6, wherein some characters in the vehicle identification code are numeric values each of which is expressed by a binary code, wherein the encoding section extracts the binary code that expresses the numeric value from the inputted vehicle identification code, wherein the encoding section interprets a string containing the numeric values expressed by the extracted binary codes as a single decimal number, and expresses the decimal number with a binary code to generate the storage code.

8. A device for storing a vehicle identification code that includes a character string of a plurality of digits, the device comprising:
    a writing request detection section that detects a request for writing the vehicle identification code;
    an encoding section that compresses and encodes the vehicle identification code that corresponds to the detected writing request, thereby generating a storage code; and a storage code storing section that stores the storage code, wherein each character in the vehicle identification code is expressed by a binary code corresponding to an ASCII code and is inputted to the encoding section, wherein a different storage code is assigned to each character in advance, and wherein the encoding section expresses the inputted binary code by one of the storage codes such that the inputted binary code is converted into a binary code the number of bits of which is less than that of the inputted binary code.

9. The device according to claim 8, wherein six-bit storage codes that are different from the ASCII codes are created, and wherein the encoding section assigns a different one of the six-bit codes to each character in the vehicle identification code.

10. The device according to claim 8, wherein each character in the vehicle identification code is selected from thirty-three characters, wherein the encoding section assigns a different one of decimal numbers from 0 to 32 as a storage code to each of the thirty three characters in advance.

11. A method for storing a vehicle identification code that includes a character string of a plurality of digits, the method comprising:

detecting a request for writing the vehicle identification code;

compressing and encoding a vehicle identification code that corresponds to the detected the writing request, thereby generating a storage code; and storing the encoded storage code in a storage medium, wherein each character in the vehicle identification code is expressed by code data representing the character and overhead bit data appended to the code data, wherein, when the vehicle identification code is compressed into the storage code, at least part of the overhead bit data is deleted.

12. A method for storing a vehicle identification code that includes a character string of a plurality of digits, the method comprising:

detecting a request for writing the vehicle identification code;

compressing and encoding a vehicle identification code that corresponds to the detected the writing request, thereby generating a storage code; and storing the encoded storage code in a storage medium, wherein some characters in the vehicle identification code are numeric values each of which is expressed by a binary code, wherein the binary code that expresses the numeric value is extracted from the inputted vehicle identification code, wherein a string containing the numeric values expressed by the extracted binary codes is interpreted as a single decimal number, and the decimal number is expressed by a binary code and used for the storage code.

13. A method for storing a vehicle identification code that includes a character string of a plurality of digits, the method comprising:

detecting a request for writing the vehicle identification code;

compressing and encoding a vehicle identification code that corresponds to the detected the writing request, thereby generating a storage code; and storing the encoded storage code in a storage medium, wherein each character in the vehicle identification code is expressed by an inputted binary code that corresponds to a hexadecimal number equal to or greater than a predetermined value, wherein, when the vehicle identification code is compressed into the storage code, a hexadecimal number equal to or less than the predetermined value is subtracted from a hexadecimal number corresponding to the inputted binary code, and wherein the resultant of the subtraction is expressed by a storage binary code the number of bits of which is less than that of the inputted binary code.

14. A device for storing a vehicle identification code that includes a character string of a plurality of digits, the device comprising:

an input interface that inputs a vehicle identification code;

a computer that compresses and encodes the inputted vehicle identification code, thereby generating a storage code; and a storage code storing section that stores the storage code, wherein each character in the vehicle identification code is inputted as proper data to the computer, the proper data contains code data representing the character and overhead bit data appended to the code data, wherein the computer deletes at least part of the overhead bit data, thereby compressing the vehicle identification code into the storage code.

15. A method for storing a vehicle identification code that includes a character string of a plurality of digits, the method comprising:

detecting a request for writing the vehicle identification code;

compressing and encoding a vehicle identification code that corresponds to the detected the writing request, thereby generating a storage code; and storing the encoded storage code in a storage medium, wherein each character in the vehicle identification code is expressed by a binary code corresponding to an ASCII code, wherein a different storage code is assigned to each character in advance, wherein the binary code is expressed by one of the storage codes, and wherein each storage code has a number of bits that is less than that of the binary code.

16. The method according to claim 15, wherein each character in the vehicle identification code is selected from thirty-three characters, wherein a different one of decimal numbers from 0 to 32 is assigned as a storage code to each of the thirty three characters in advance.

* * * * *